United States Patent [19]
Pottinger et al.

[11] 3,985,071
[45] Oct. 12, 1976

[54] BASKET FOR USE IN DEEP FAT COOKING OF COMESTIBLES

[75] Inventors: Eugene A. Pottinger; Winston L. Shelton, both of Louisville, Ky.

[73] Assignee: Collectramatic, Inc., Jeffersontown, Ky.

[22] Filed: Nov. 26, 1975

[21] Appl. No.: 635,412

[52] U.S. Cl. .................................. 99/403; 99/353; 99/449; 99/450; 126/25 R; 211/181; 312/213
[51] Int. Cl.² ........................................ A47J 37/12
[58] Field of Search ............ 99/403, 279, 330, 336, 99/345, 349, 353–354, 355–356, 359, 404–405, 406–407, 408, 410–411, 412–413, 414–415, 416–417, 418, 427, 448–449, 450; 126/25; 211/181; 312/213

[56] References Cited
UNITED STATES PATENTS

| 317,998 | 5/1885 | Holt ........................... 312/213 X |
| 1,032,084 | 7/1912 | Ritzenhoff ..................... 99/449 UX |
| 1,101,730 | 6/1914 | Day ................................ 99/359 |
| 1,266,816 | 5/1918 | Kinnie ............................ 99/448 X |
| 1,266,912 | 5/1918 | Bradbury ....................... 99/403 X |
| 1,491,974 | 4/1924 | Shaffer .......................... 99/403 X |
| 2,138,967 | 12/1938 | Harris ........................... 99/416 X |
| 3,466,997 | 9/1969 | Hartzog ......................... 99/411 X |
| 3,519,318 | 7/1970 | Hagen .......................... 312/213 X |
| 3,534,677 | 10/1970 | Keathley ....................... 99/448 X |
| 3,613,553 | 10/1971 | Popeil ........................... 99/448 X |

FOREIGN PATENTS OR APPLICATIONS

| 86,002 | 8/1895 | Germany ......................... 99/449 |
| 276,438 | 7/1914 | Germany ......................... 99/449 |
| 59,632 | 1/1912 | Switzerland ..................... 99/449 |

*Primary Examiner*—Peter Feldman
*Assistant Examiner*—Arthur O. Henderson
*Attorney, Agent, or Firm*—William E. Sherwood

[57] ABSTRACT

A clamshell type of basket for use in deep fat cooking of comestibles and provided with features especially adapted to commercial fast-service cooking, is disclosed.

6 Claims, 4 Drawing Figures

BASKET FOR USE IN DEEP FAT COOKING OF COMESTIBLES

BACKGROUND OF THE INVENTION

In contrast to the cooking of foodstuffs by the housewife in her kitchen, the cooking of such food in present day fast-service commercial establishments dictate the use of certain standardized procedures requiring equipment especially designed for the purpose. For example, in the cooking of breaded foods such as chicken parts a basket holding the same is removably positioned in the cooking vessel. For optimum fast service such a basket should be easily loaded and unloaded, should permit the several food articles to be cooked without sticking together, and should be capacious so that a substantial amount of food may be cooked during one cycle of operation of the cooking apparatus. Although various forms of baskets and trays have been disclosed in the prior art it is found that they embody certain disadvantages which it is a purpose of the present invention to overcome. Use of baskets such as shown by Keathley U.S. Pat. No. 3,534,677 and Simens U.S. Pat. No. 3,800,692 entails a slow loading procedure; use of baskets such as shown by Harris U.S. Pat. No. 2,138,967 permits the food articles to stick together unless the vessel is opened and the basket is shaken during the cooking; and use of a stacked tray basket such as shown by Pelster et al. U.S. Pat. No. 3,677,174 3,677,174 also entails slow loading and unloading procedures.

SUMMARY

The present invention is particularly useful in the cooking of food, such as breaded chicken parts, in a pressure cooking apparatus such as disclosed in our U.S. Pat. No. 3,677,170 and comprises an improved cooking basket. The basket has perforate sidewall portions hingedly secured to each other and with upwardly extending handles. The sidewalls are movable between an opened basket-loading-and-unloading position and a closed basket position at which the basket may be disposed adjacent the inner wall of a cooking vessel having a body of hot liquid therein. Each of the sidewalls supports at least one and preferably a plurality of generally horizontal perforate shelves which project into the space defined by its companion sidewall when the basket occupies its closed position.

Among the objects of the invention are the provision of an improved basket for deep fat cooking of comestibles in commercial fast-service establishments; the provision of a basket which may easily and rapidly be loaded with breaded articles of foods; the provision of a basket whose side portions are reinforced with a member serving as a handle; the provision of a basket which may be inserted into and removed from a cooking vessel with a minimum of vibration, and the provision of a basket having shelves from which cooked breaded food may be slid without excessive breaking of the crust.

These and other objects and advantages of the invention will become more apparent as the description proceeds and when considered in conjunction with the drawings, in which FIG. 1 is an elevation view of the closed basket positioned within the cooking vessel in which it is to be used;

Figure 1:
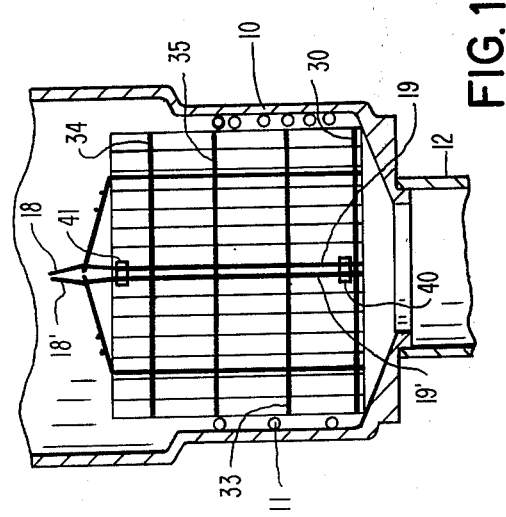
Figure 4:
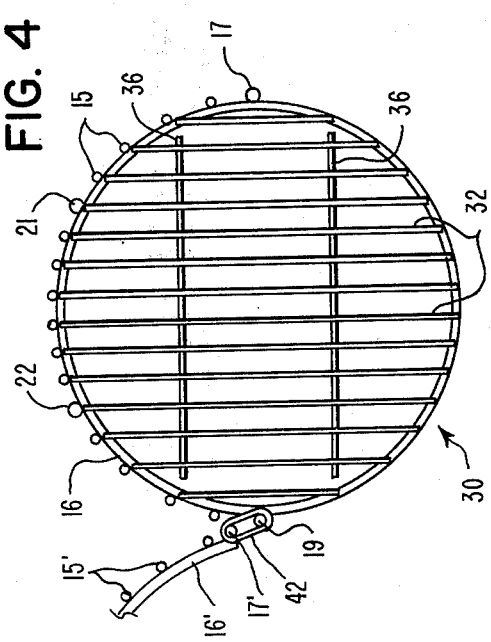
FIG. 4 is a sectional view to a larger scale taken on line 4—4 of FIG. 3.

Referring first to FIG. 1, the basket is shown in its closed position and occupying its normal cooking position adjacent the wall 10 of a cooking vessel such as disclosed in the aforementioned U.S. Pat. No. 3,677,170. As will be apparent, hot cooking oil heated by coil 11 is free to circulate within the vessel and with the basket and its contents being submerged therein. Any breading loosened from the food resting on the shelves gradually drops into the removable collector unit 12 as more fully explained in said patent.

Figure 2:
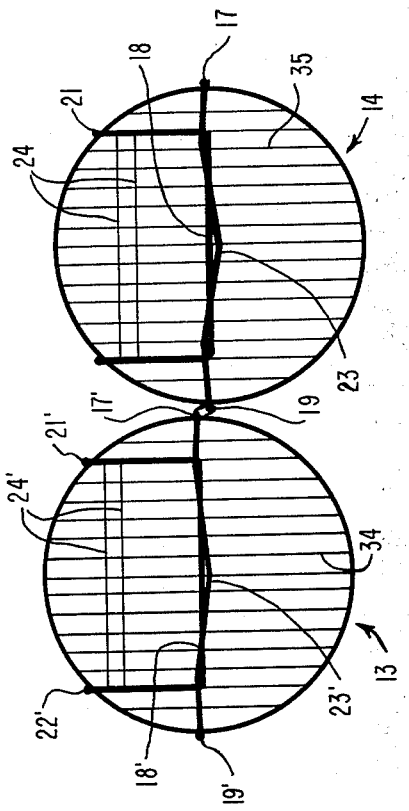
FIG. 2 is a plan view of the basket in its opened position.
Figure 3:
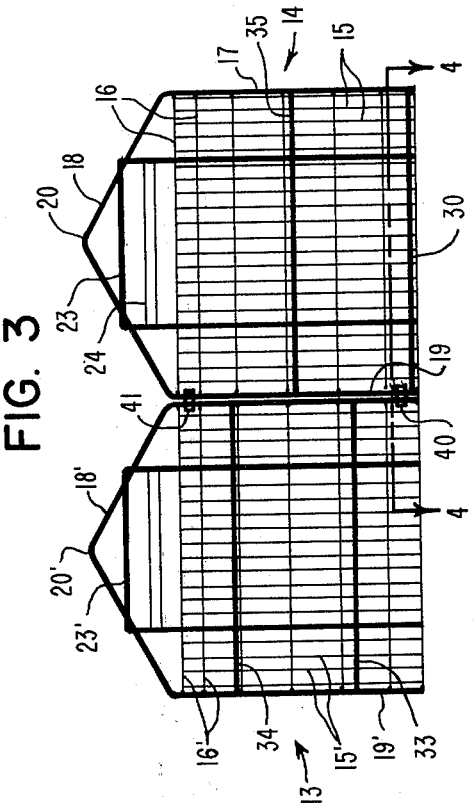
FIG. 3 is an elevation of the basket shown in FIG. 2.

The preferred construction of the basket, as best seen in its opened position represented by FIGS. 2 and 3, includes complementary first and second wall portions indicated generally at 13, 14 and which have a geometry (here shown as semi-cylindrical) consistent with the geometry of the inner wall 10 of the cooking vessel with which the basket is to be used. For ease of manufacture in a single jig the two walls preferably are identical and comprise spaced vertical numbers 15, 15' which conveniently may be stainless steel, one-eighth inch, rods spaced about one inch apart. These rods are suitably affixed to a plurality of spaced horizontal members 16, 16' which may comprise rods of similar size and material, and the vertical rods preferably are located outboard of the horizontal rods so that the basket may be inserted and removed from the cooking vessel without undue vibration.

Affixed to the extreme ends of the horizontal members are somewhat larger, for example three-sixteenth inch vertical rods, serving for reinforcement and as handle portions. On one basket portion such rod comprises an upwardly directed leg 17 extending over the top of the basket as at 18 and terminating in a downwardly extending leg 19 to which hinges later to be described are affixed. At its uppermost portion this handle rod is bent at 20 so as to provide a convenient notch into which a lifting tool or bracket support for draining (not shown) may be engaged. A similar handle rod with portions 17', 18', 19' and 20' forms part of the companion basket portion.

Additional reinforcement is provided by another vertical rod of similar size for the basket portion 14 and having an upwardly directed leg 21 spaced from leg 17 of the above described reinforcing rod and a downwardly directed leg 22 spaced from leg 19. These legs 21 and 22 are connected by the cross portion 23 which is disposed above the uppermost horizontal member 16 and which is bent to encompass and to be attached to an upper portion of the described handle rod. A suitable number of short connecting rods 24 between the legs 21, 22 provide additional bracing and serve to restrain food articles from floating upwardly from the uppermost shelf of the basket. A similar arrangement of rod portions is provided for the companion basket portion 13, as indicated by references 21', 22', 23' and 24'.

With the above description in mind reference now is made to FIGS. 1 and 3 showing the relative positions of shelves for the basket and which includes at least one shelf affixed to each of the basket portions 13 and 14. Each shelf is similar to a lower shelf 30 shown attached to basket portion 14 and comprises a peripheral rod 31 affixed along about half of its periphery to the interior surfaces of the vertical wall members 15 and with spaced parallel rods 32 affixed at their ends to the upper surface of that peripheral rod. As seen in the opened basket position of FIG. 2 these parallel rods are directed toward the open edge of the shelf and thus permit the cooked food to be slid easily from the basket when that basket is suitably tipped, thus permitting the entire load of cooked food to be removed quickly and without excessive breaking of the crust of cooked breaded food. Similarly constructed shelves 33, 34 attached to basket wall portion 13 and an intermediate interleaved shelf 35 attached to wall portion 14 serve to provide separate confinement for food resting on the shelves when the basket is in its closed position. The lowermost shelf may also be provided with abutment members 36 on its lower face to hold the entire basket above any projecting part in the lower end of the cooking vessel and which otherwise might dislodge food lying on that lower shelf by projection between the rods 32.

Any suitable connecting means may be employed to join the respective first and second basket portions 13, 14. One convenient means comprises a pair of hinge members 40, 41 each having a loop 42 rigidly affixed to the leg 17' of the handle rod of the first basket portion and journalling for pivoted movement the leg 19 of the handle rod of the other basket portion. Preferably the lower hinge is located adjacent the lower shelf 30 and the upper hinge is located above the upper shelf 34.

When the two basket portions are pivoted to closed position the handles of the same then lie parallel to each other and the basket may be lifted with any suitable tool and inserted vertically downward into the cooking vessel. Moreover, after cooking is completed and the cover of the vessel is lifted, a suitable tool may be used to engage the handles for lifting the basket of cooked food and such a tool may support the basket above the open vessel until draining of excess fluid from the food is completed.

As will be apparent, approximately half of the shelf area projects outwardly from the wall portion to which it is attached and the shelves are staggered approximately equal distances from their adjacent shelves. Loading of the food in a suitable pattern upon each shelf may be easily carried out and when this is done the basket wall portions are then closed into the position shown in FIG. 1 at which time the two basket wall portions serve to confine the food laterally while at the same time each shelf confines food located on the next lower shelf and the reinforcing rods 24 confine food in the space above the upper shelf.

Having thus described a perferred form of basket it will be understood that the same may be employed in the cooking of foods other than breaded chicken parts and in connection with cooking vessels other than that shown in the above-identified U.S. Pat. No. 3,677,170.

What is claimed is:

1. A basket for use in the deep fat cooking of comestibles comprising, first and second generally vertical perforate sidewall portions hingedly secured to each other and movable between an opened basket-loading-and-unloading position and a closed-basket position, said basket when in said closed position providing a shelf being adapted to fit adjacent the interior wall of a cooking vessel, each of said sidewall portions having at least one generally horizontal perforate shelf rigidly secured thereto and projecting into the portion of said space defined by its companion sidewall portion when the basket occupies its closed position, said shelves being spaced vertically from each other, and means attached to each of said sidewall portions and extending upwardly to form a pair of cooperating handles for use in the manipulation of said basket.

2. A basket as defined in claim 1 wherein each of said sidewall portions includes a plurality of spaced vertical rods affixed to a plurality of spaced horizontal rods and with the vertical rods at the extreme vertical edges of the sidewall portion forming the handle for that sidewall portion.

3. A basket as defined in claim 2 wherein at least one of said vertical rods of each sidewall portion projects upwardly of the sidewall portion and is attached to the vertical rods serving as the handle for that sidewall portion, thereby to provide reinforcement of the wall structure.

4. A basket as defined in claim 2 wherein said shelf comprises a peripheral member secured to the inner surface of said spaced vertical rods and with a plurality of parallel spaced rods having their ends attached to said peripheral member.

5. A basket as defined in claim 4 wherein said parallel rods are disposed above said peripheral member and are directed toward the open edge of the shelf.

6. A basket as defined in claim 2 wherein said horizontal rods are affixed to the inner surfaces of said vertical rods, thereby to permit insertion and removal of said basket from said vessel with a reduced amount of vibration.

* * * * *